US010204466B1

(12) United States Patent
Rothmuller

(10) Patent No.: US 10,204,466 B1
(45) Date of Patent: Feb. 12, 2019

(54) CONTINUOUS CALIBRATION OF A CONTROL DEVICE

(71) Applicant: Nortek Security & Control LLC, Carlsbad, CA (US)

(72) Inventor: Michael Rothmuller, San Diego, CA (US)

(73) Assignee: Nortek Security & Control LLC, Carlsbad, CA (US)

( * ) Notice: Subject to any disclaimer, the term of this patent is extended or adjusted under 35 U.S.C. 154(b) by 0 days.

(21) Appl. No.: 15/896,306

(22) Filed: Feb. 14, 2018

(51) Int. Cl.
G07C 9/00 (2006.01)
G05B 19/042 (2006.01)
E05F 15/43 (2015.01)
E05F 15/77 (2015.01)

(52) U.S. Cl.
CPC .......... *G07C 9/00309* (2013.01); *E05F 15/43* (2015.01); *E05F 15/77* (2015.01); *G05B 19/042* (2013.01); *G07C 9/00571* (2013.01); *G07C 2009/00928* (2013.01); *G07C 2209/62* (2013.01)

(58) Field of Classification Search
CPC . E05F 15/70; E05F 15/72; E05F 15/74; E05F 15/79; E05F 15/77; E05F 15/43; G05B 19/042; G07C 9/00571; G07C 2009/00928; G07C 2209/62; G07C 9/00309; H04W 4/90; G08B 21/10; G06Q 50/28
USPC .......................................... 340/5.71; 318/282
See application file for complete search history.

(56) References Cited

U.S. PATENT DOCUMENTS

| | | | | |
|---|---|---|---|---|
| 2001/0013762 | A1* | 8/2001 | Roman | E05F 15/70 318/282 |
| 2017/0175433 | A1* | 6/2017 | Kang | E05F 15/77 |

* cited by examiner

*Primary Examiner* — Ali Neyzari
(74) *Attorney, Agent, or Firm* — Schwegman Lundberg & Woessner, P.A.

(57) ABSTRACT

A device has a distance sensor and a transmitter. The distance sensor, attached to a barrier, measures an opening formed by the barrier. The transmitter transmits a control signal to a barrier controller. The barrier controller controls a movement of the barrier based on the control signal. The device receives a requested size of the opening. The device transmits, to the barrier controller, a first control signal that instructs the barrier controller to move the barrier and a second control signal that instructs the barrier controller to stop the movement of the barrier after an elapsed time has expired. The device measures a final size of the opening and adjusts the elapsed time based on the final size of the opening and the requested size of the opening.

20 Claims, 8 Drawing Sheets

CONTINUOUS CALIBRATION OF A CONTROL DEVICE

TECHNICAL FIELD

This application relates generally to a system and method for calibrating a secondary control device that is used for controlling a primary control device, and, in an example embodiment, a secondary control device that is continuously being calibrated.

BACKGROUND

Commonly, the position of an overhead garage door is determined based on three types of sensors: end limit switches, a tilt switch, and an accelerometer. The end limit switches determine whether the garage door is completely closed, fully open, or somewhere in between. The tilt switch will only trigger at one particular angle based on the angular position of the tilt switch. In many garage door control systems, the tilt switch cannot be used to identify or determine a partially closed or partially opened position of the garage door. For example, if the garage door is left partially open, the tilt switch may not be able to signify open until the garage door has opened past the point where someone can sneak in under the gap.

The accelerometer can be used to tell the angle of the garage door and can work well for one-piece garage doors (also known as California garage doors). However, for a segmented door, the accelerometer can be placed on any segment, section, or panel. For example, if the accelerometer is placed on the top panel, the sensor is very good at determining that the garage door is open just a little bit, but often is unable to determine the difference between that little bit and all the way open. The opposite is true for the bottom segment.

Therefore, the use of limit switches, a tilt switch sensor, or an accelerometer may not be useful in determining the position of an overhead garage door as the door is opening/closing.

BRIEF DESCRIPTION OF THE DRAWINGS

The present embodiments are illustrated by way of example, and not by way of limitation, in the figures of the accompanying drawings.

DETAILED DESCRIPTION

Figure 1:
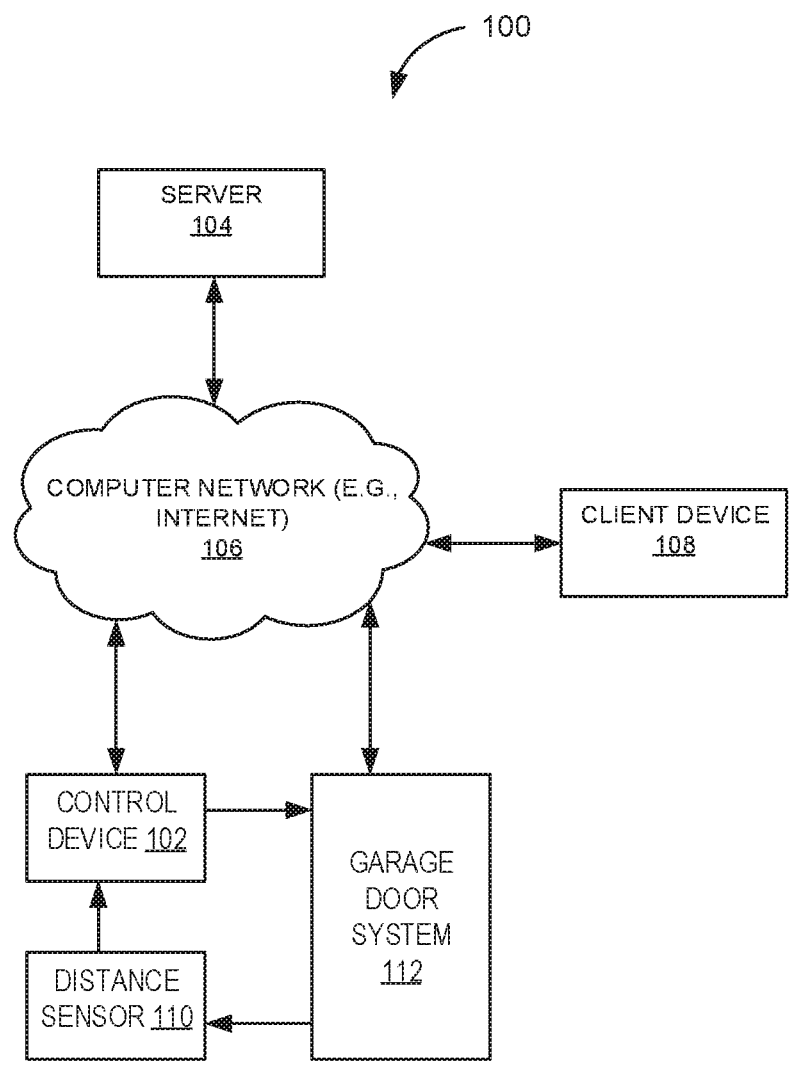
FIG. 1 is a block diagram illustrating an example embodiment of a network system for implementing a control device.

Although the present disclosure has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense.

The present disclosure describes a control device for controlling a barrier system such as a garage door system. The control device sends a signal to the barrier system to open or close a garage door. The control device enables a more precise control of the garage door system by allowing the garage door to be opened within a requested opening distance. For example, the control device sends a start signal to the garage door system to open the garage door and a stop signal to stop the movement of the garage door such that the opening formed by the garage door is at the requested opening distance. In another example, a secondary control device controls a primary control device for controlling a barrier associated with the primary control device.

In various embodiments, a control device for controlling a barrier system is described. The control device comprises a distance sensor, a transmitter, and a processor. The distance sensor is mounted to a barrier (e.g., garage door, a window, blinds, shades, sliding door). The distance sensor measures a size of an opening formed by the barrier. For example, the distance sensor measures the height of the opening formed between the garage door and a floor. The transmitter transmits a control signal to a barrier controller (e.g., garage door system) that controls a movement of the barrier based on the control signal. The control device receives a requested size of the opening (e.g., open garage door to 5 inches), transmits to the barrier controller a first control signal that instructs the barrier controller to move the barrier (e.g., open the garage door). The control device transmits, to the barrier controller, a second control signal that instructs the barrier controller to stop the movement of the barrier after an elapsed time (e.g., stop the garage door after 3 seconds). The distance sensor measures a final size of the opening after the elapsed time. The control sensor adjusts the elapsed time based on the final size of the opening and the requested size of the opening. The measurement from the distance sensor and the time adjustment from the control sensor may be referred to as a calibration process. The calibration process may be performed every time the barrier controller receives a control signal to open or close the barrier. One advantage of performing the calibration process on a frequent basis (e.g., every time the barrier is open) would be to account for environmental changes such as weather conditions (e.g., snow).

In another example embodiment, the control device determines that the final size of the opening is at least equal to the requested size of the opening. The control device transmits the second control signal to the barrier controller in response to determining that the final size of the opening is at least equal to the requested size of the opening.

In another example embodiment, the control device determines the elapsed time based on the determining that the final size of the opening is at least equal to the requested size of the opening. The distance sensor measures the final size of the opening after the barrier has stopped moving.

In another example embodiment, the control device calculates a speed of the movement of the barrier based on a sampling of the size of the opening. The control device then calculates a size difference between the requested size of the opening and the final size of the opening. A time difference is computed based on the size difference and the speed of the movement of the barrier. The control device recursively adjusts the elapsed time by subtracting the calculated time difference from the elapsed time.

In another example embodiment, the control device receives a second requested size of the opening. The control device computes a second elapsed time based on the second requested size of the opening, the speed of the movement of the barrier, and the time difference. The control device transmits, to the barrier controller, the first control signal. The control device transmits, to the barrier controller, the second control signal (after the first control signal) after the second elapsed time has expired.

In another example embodiment, the distance sensor measures an offset distance between the distance sensor and an obstacle to the barrier in a closed position of the barrier. The obstacle to the barrier is adjacent to the barrier in the closed position of the barrier. The control device adjusts the requested size of the opening by the offset distance, and adjusts the final size of the opening by the offset distance.

In another example embodiment, the control device receives a wireless communication from a mobile device. The wireless communication identifies the requested size of the opening. The control device wirelessly communicates the first control signal to the barrier controller. The control device wirelessly communicates the second control signal to the barrier controller.

In another example embodiment, the control device identifies a server registered with the barrier controller and provides data identifying opening sizes and corresponding adjusted elapsed times to the server.

In another example embodiment, the barrier comprises one of a window, a door, and a garage door. The distance sensor measures the size of the opening formed between an end of the barrier and an obstacle, the end of the barrier being adjacent to the obstacle when the barrier is in a closed position of the barrier.

In another example embodiment, the control device is configured to communicate with a garage door system, home/facility security or automation system, or other electronic system.

FIG. 1 is a block diagram illustrating an example embodiment of a network system for implementing a control device 102. The control device 102 is coupled to a distance sensor 110. The distance sensor 110 includes a measuring device for measuring a distance between the distance sensor 110 and an obstacle (e.g., a wall, a floor, a reflector). The distance sensor 110 can include different types of measuring devices (e.g., laser, infrared).

The distance sensor 110 is mounted to a garage door (not shown) from a garage door system 112. The control device 102 communicates with the garage door system 112 via wireless means (e.g., RF, Wi-Fi, Bluetooth) to send instructions or commands to trigger a movement of the garage door to open or close the garage door. In one example embodiment, the control device 102 sends a signal to a garage door controller (not shown) from the garage door system 112.

The control device 102 communicates with a server 104 via a communication network 106 (e.g., the Internet). The server 104 receives the status of the garage door and can perform different functions (e.g., open, close, open at specific height) based on the status of the garage door system 112. For example, the server 104 can alert or notify a client device 108 (e.g., a smart phone) registered or associated with the garage door system 112 that the garage door has been left open for more than 10 minutes. The server 104 can also receive instructions from the client device 108 to open the garage door 10 inches from the ground. The server 104 communicates the desired height of the opening of the garage door to the control device 102 or to the garage door system 112 to direct the garage door to open or close to the desired height. In one example, the control device 102 sends a command to stop a movement of the garage door when the opening distance as measured by the distance sensor 110 has reached the desired height or requested height.

In another example embodiment, the garage door system 112 communicates with the server 104, the control device 102, and the client device 108 via the communication network 106 (e.g., the Internet).

Figure 2:
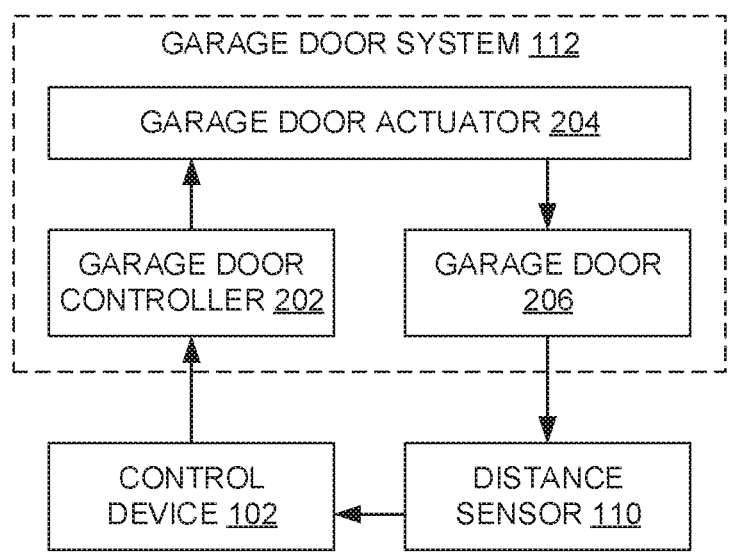
FIG. 2 is a block diagram illustrating an example embodiment of a garage door system and a control device.

FIG. 2 is a block diagram illustrating an example embodiment of the garage door system 112 and the control device 102. The garage door system 112 includes a garage door actuator 204 (e.g., a motor driving a chain), a garage door controller 202 connected to the garage door actuator 204, and the garage door 206 controlled by the garage door actuator 204. The garage door controller 202 may include a wireless receiver for receiving a control signal to enable or disable the garage door actuator 204 (e.g., turn on or off to open or close the garage door 206). The control device 102 wirelessly communicates with the garage door controller 202 to control a movement of the garage door 206 using the garage door actuator 204.

The distance sensor 110 can be mounted to the garage door 206 to measure a size of an opening of the garage door 206. For example, the distance sensor 110 measures a height of an opening of the garage door 206 and communicates the height of the opening of the garage door 206 to the control device 102. The control device 102 sends a stop signal to the garage door controller 202 based on the height of the opening of the garage door 206. In one example embodiment, the distance sensor 110 measures and operates when the garage door 206 is moving. In another example embodiment, the distance sensor 110 periodically measures the size of the opening of the garage door 206 (e.g., every 0.5 ms). In one example, the control device 102 and the distance sensor 110 form a continuous feedback loop to the garage door controller 202.

Figure 3A:
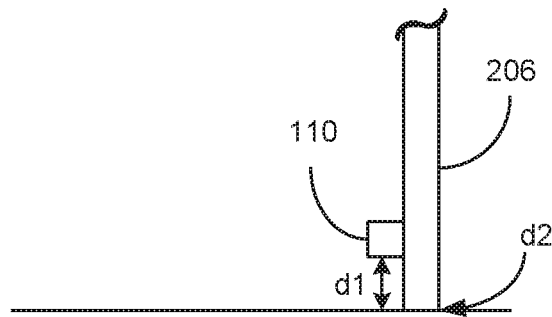
FIG. 3A is a block diagram illustrating a side view of an example embodiment of a distance sensor mounted to a garage door that is in a closed position.

FIG. 3A is a block diagram illustrating a side view of an example embodiment of the distance sensor 110 mounted to the garage door 206 that is in a closed position. The distance sensor 110 measures a distance d1 and associates distance d1 with distance d2 (which is close to zero when the garage door 206 is closed). The distance d1 may be referred to as an offset distance.

Figure 3B:
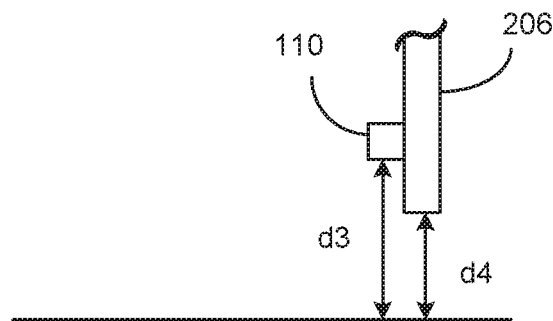
FIG. 3B is a block diagram illustrating a side view of an example embodiment of a distance sensor mounted to a garage door that is in a partially open position.

FIG. 3B is a block diagram illustrating a side view of an example embodiment of the distance sensor 110 mounted to the garage door 206, which is in a partially open position. The distance sensor 110 measures a distance d3. The opening distance d4 is computed by subtracting the offset distance d1 from d3.

Figure 4:
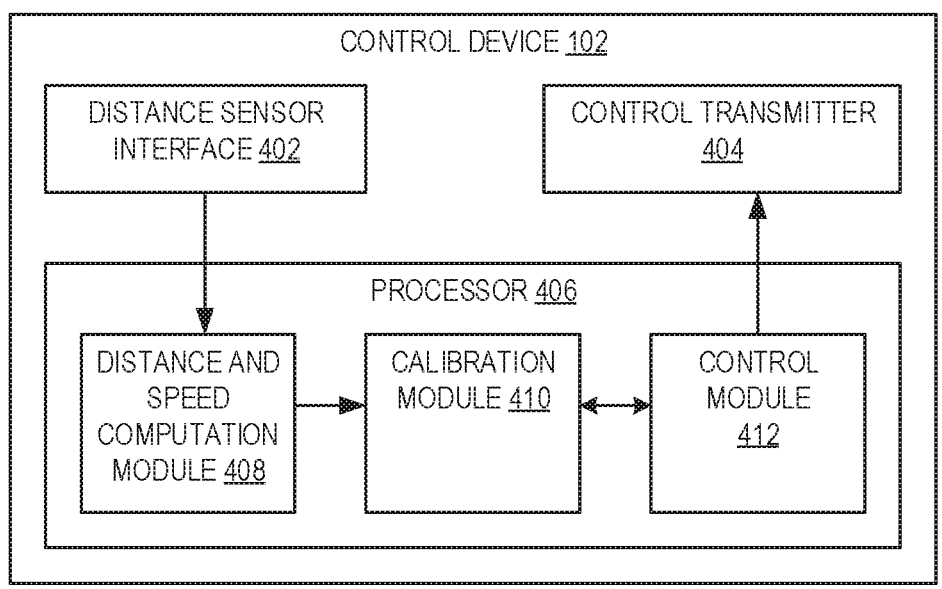
FIG. 4 is a block diagram illustrating an example embodiment of a control device.

FIG. 4 is a block diagram illustrating an example embodiment of the control device 102. The control device 102 includes a distance sensor interface 402, a control transmitter 404, and a processor 406. The distance sensor interface 402 communicates with the distance sensor 110 and receives distance data (e.g., opening size of the garage door or window) from the distance sensor 110. The control transmitter 404 generates a control signal to the garage door controller 202 to control a movement of the garage door 206. Different control signals can be used to open the garage door 206, close the garage door 206, or stop a movement of the garage door 206.

The processor 406 includes a distance and speed computation module 408, a calibration module 410, and a control module 412. The control module 412 receives the requested opening distance, sends a request to open the garage door 206 to the control transmitter 404, sends a request to stop a movement of the garage door 206 either based on an elapsed time or based on a measured opening size of the garage door 206. In one example embodiment, when the control module 412 determines that the opening of the garage door 206 is at least equal to the requested opening distance (or within a preset threshold of the requested opening distance), the control module 412 sends a request to stop the movement of the garage door 206. In another example embodiment, the control module 412 computes an elapsed time based on the requested opening distance of the garage door 206 and the speed of the movement of the garage door 206. For example, it takes one second to reach an opening size of one foot. The control module 412 sends a request to stop the movement of the garage door 206 after the elapsed time has passed (or within a threshold of the elapsed time (e.g., within 1 ms of one second)).

The distance and speed computation module 408 receives distance data (e.g., opening sizes, height, width) from the distance sensor interface 402. In one example embodiment, the distance and speed computation module 408 receives samples of opening sizes at periodic intervals to calculate a speed of the movement of the garage door 206. Therefore, the distance and speed computation module 408 can compute an opening speed of the garage door 206 and a closing speed of the garage door 206 based on the sampled opening distances while the garage door 206 is opening or closing.

The calibration module 410 accesses the computed speed from the distance and speed computation module 408 and determine an offset trigger time (also referred to as delta t). For example, the calibration module 410 calculates a size difference between a requested opening distance and an actual opening distance of the garage door 206 (after the garage door 206 stops moving). The calibration module 410 then calculates the offset trigger time (delta t) based on the size difference and the opening or closing speed of the garage door 206. The calibration module 410 provides the offset trigger time (delta t) to the control module 412 such that the control module 412 adjusts the elapsed time by the offset trigger time. For example, instead of sending a stop signal to the control transmitter 404 after an elapsed time t1 of one second, the control module 412 sends the stop signal to the control transmitter 404 before the elapsed time t1 (e.g., t1-delta t). In another example embodiment, the control module 412 periodically adjusts a timing of sending a control signal to the control transmitter based on a periodic computation of delta t (e.g., every time the garage door is instructed to open or close). In another example embodiment, the calibration module 410 periodically computes different offset trigger times based on whether the garage door is opening or closing. For example, the control module 412 periodically computes a closing offset trigger time associated with a closing command when the garage door closes. Similarly, the control module 412 periodically computes an opening offset trigger time associated with a closing command when the garage door opens. The opening offset trigger time may differ from the closing offset trigger time because the opening speed of the garage door 206 may be different from the closing speed of the garage door 206.

In another example embodiment, the control device 102 receives data from an accelerometer (not shown) mounted to the garage door 206. The control device 102 combines the data from the accelerometer and the distance sensor 110 to cross-correlate the actual distance. For example, the control transmitter 404 sends a signal to stop and reverse. The processor 406 generates an alarm if the accelerometer detects that the barrier door is moving but distance measured by the distance sensor 110 does not seem to correlate.

Figure 5:
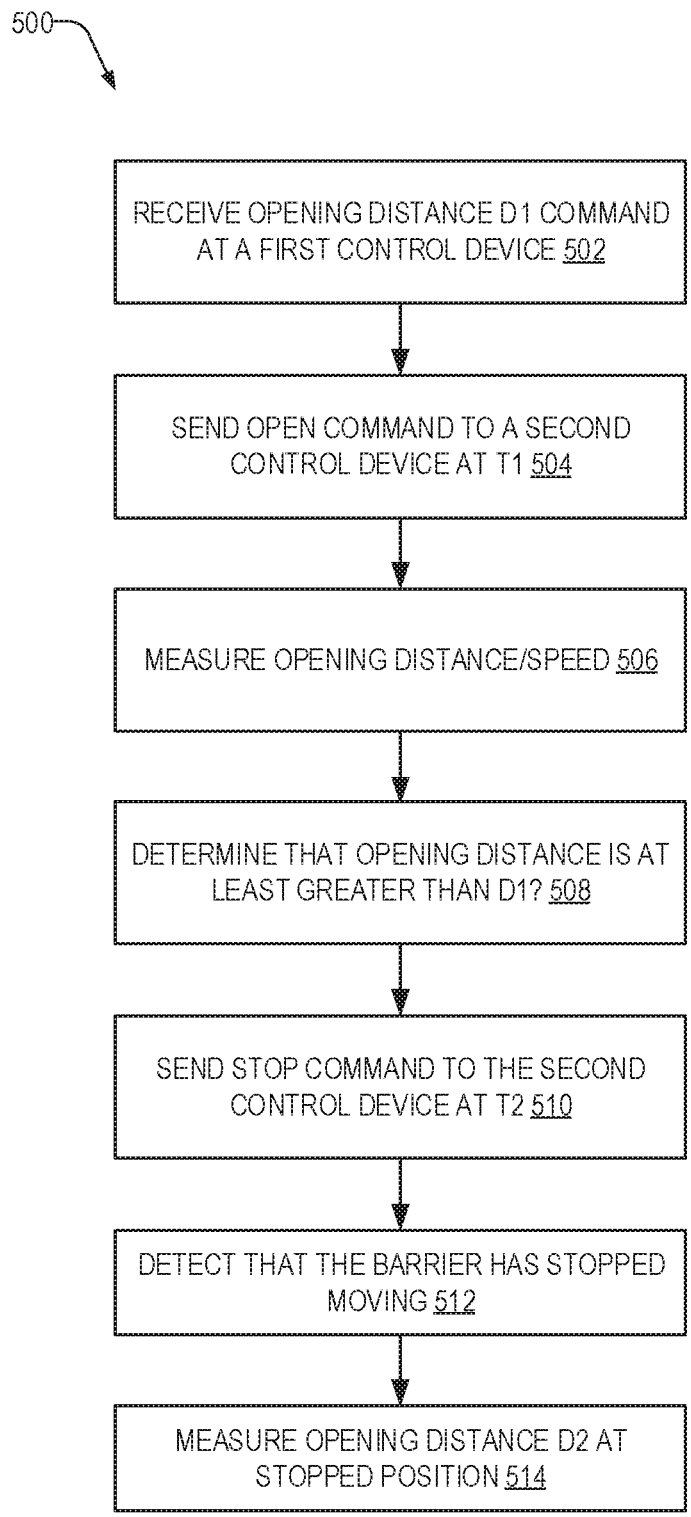
FIG. 5 is a flow diagram illustrating an example embodiment of a calibration method of the control device.

FIG. 5 is a flow diagram illustrating an example embodiment of a calibration method 500 of the control device 102. At operation 502, the control device 102 receives a command to open the garage door 206 to an opening distance d1. In one example embodiment, a user of the control device 102 enters or provides the opening distance on a user interface (e.g., a touchscreen or button) of the control device 102. In another example embodiment, the control device 102 receives the command to open the garage door 206 to an opening distance d1 from the server 104, the client device 108, or a device associated or operating with the garage door system 112 (e.g., a remote control paired with the garage door system 112). In another example embodiment, the control device 102 accesses the opening distance d1 from the server 104. For example, the control device 102 accesses or retrieves the opening distance d1 associated with a predefined time or a sensor status (e.g., open garage door 206 to one foot when it rains, open the garage door 206 half way when a smoke sensor in the garage detects smoke, close the garage door 206 all the way between dusk and dawn, etc.). The opening distances and the corresponding conditions may be stored at the server 104 or at the control device 102.

At operation 504, the control device 102 sends a control signal (e.g., open command) to the garage door system 112 at a time t1. In one example embodiment, the control transmitter 404 sends an open control signal to the garage door controller 202.

At operation 506, the distance sensor 110 measures an opening size at periodic intervals so that the speed of the movement of the garage door 206 can be determined. The distance sensor 110 sends the measurement data to the control device 102. In one example embodiment, the distance sensor interface 402 of the control device 102 receives the measurement data. In another example embodiment, the distance and speed computation module 408 uses the measurement data to calculate the speed of the movement of the garage door 206.

At operation 508, the control module 412 determines whether the opening size of the garage door 206 is at least equal to the opening distance d1. In one example embodiment, the control module 412 determines whether the opening size of the garage door 206 is at least equal to the opening distance d1 or whether an elapsed time has expired since the control signal has been sent to control transmitter 404.

At operation 510, the control module 412 sends another control signal (e.g., stop command) to the garage door system 112 at a time t2. In one example embodiment, the control transmitter 404 sends the stop control signal to the garage door controller 202 when the opening size of the garage door 206 is at least equal to the opening distance d1. In another example embodiment, the control transmitter 404 sends the stop control signal to the garage door controller 202 after an elapsed time (e.g., at t2).

At operation 512, the control module 412 uses the data from the distance sensor 110 to determine that the garage door 206 has stopped moving. In another example embodiment, other types of sensors (e.g., accelerometer) on the garage door 206 can be used to determine that the garage door 206 has stopped moving.

At operation 514, the distance sensor 110 measures an opening distance d2 when the garage door 206 has stopped moving (or after a predefined elapsed time—e.g., one second after sending the stop control signal).

Figure 6:
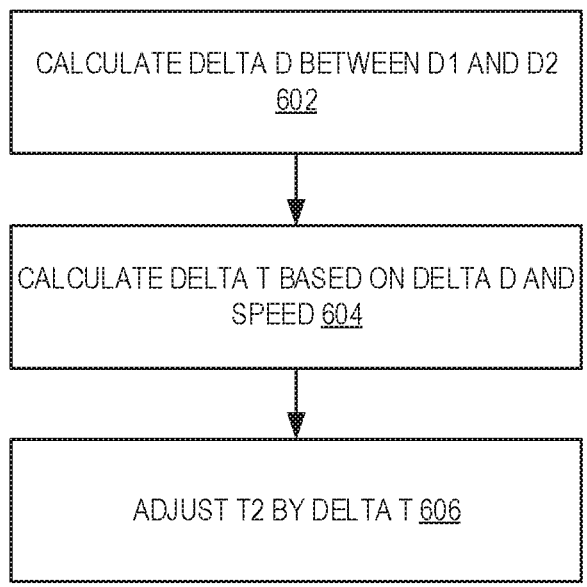
FIG. 6 is a flow diagram illustrating another example embodiment of a calibration method of the control device.

FIG. 6 is a flow diagram illustrating another example embodiment of a calibration method 600 of the control device 102. At operation 602, the control device 102 calculates a size difference between a request opening distance and an actual opening distance. For example, the size difference includes the difference between d1 and d2. In one example embodiment, the calibration module 410 computes the size difference (e.g., delta d) based on measurements from the distance and speed computation module 408.

At operation 604, the control device 102 calculates a time offset based on delta d and the speed of the garage door 206. In one example embodiment, the calibration module 410 computes the time offset (e.g., delta t) based on measurements from the distance and speed computation module 408.

At operation 606, the control device 102 adjusts an elapsed time t2 based on delta d. In one example embodiment, the control module 412 sends a stop signal sooner than t2 by delta t.

Figure 7:
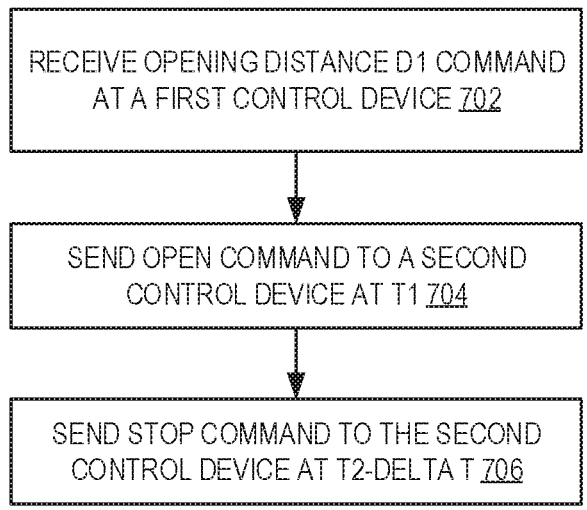
FIG. 7 is a flow diagram illustrating another example embodiment of a calibration method of the control device.

FIG. 7 is a flow diagram illustrating another example embodiment of a calibration method 700 of a control device. At operation 702, a first control device receives an opening size d1. At operation 704, the first control device ends an open command, at time t1, to a second control device for controlling an opening size of a barrier. At operation 706, the first control device sends a stop command, at time t2-delta t, to the second control device.

Figure 8:
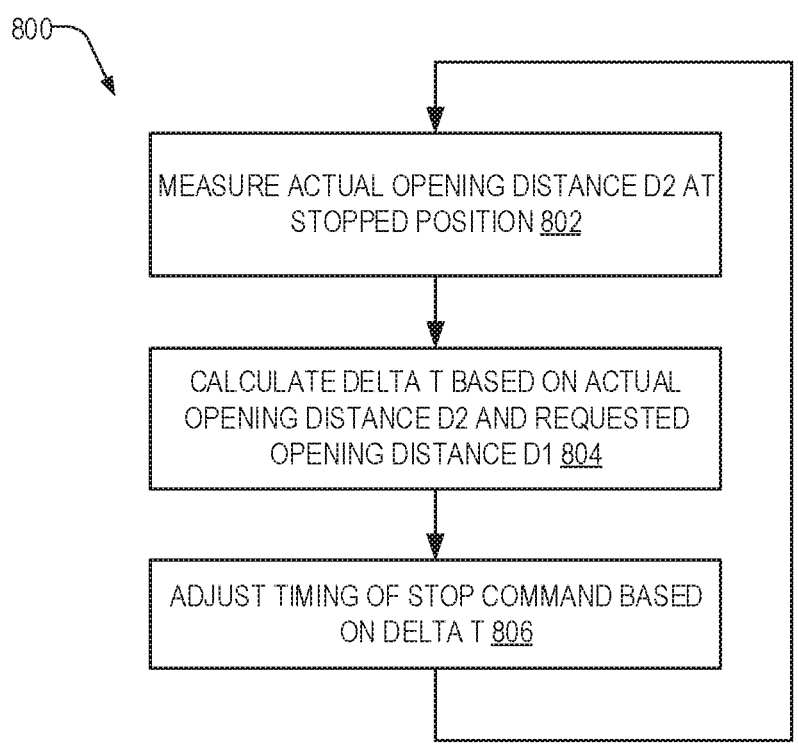
FIG. 8 is a flow diagram illustrating another example embodiment of a calibration method of the control device.

FIG. 8 is a flow diagram illustrating another example embodiment of a calibration method 800 of a control device. At operation 802, the control device 102 measures an actual opening distance d2 at a stopped position. At operation 804, the control device 102 calculates delta t based on a difference between an actual opening distance d2 and the requested opening distance d1. At operation 806, the control device 102 adjusts a timing of the stop command based on delta t. Operation 802 is recursively repeated for continuous calibration.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via the computer network 106 and via one or more appropriate interfaces (e.g., application programming interfaces (APIs)).

Example embodiments may be implemented in digital electronic circuitry, in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Figure 9:
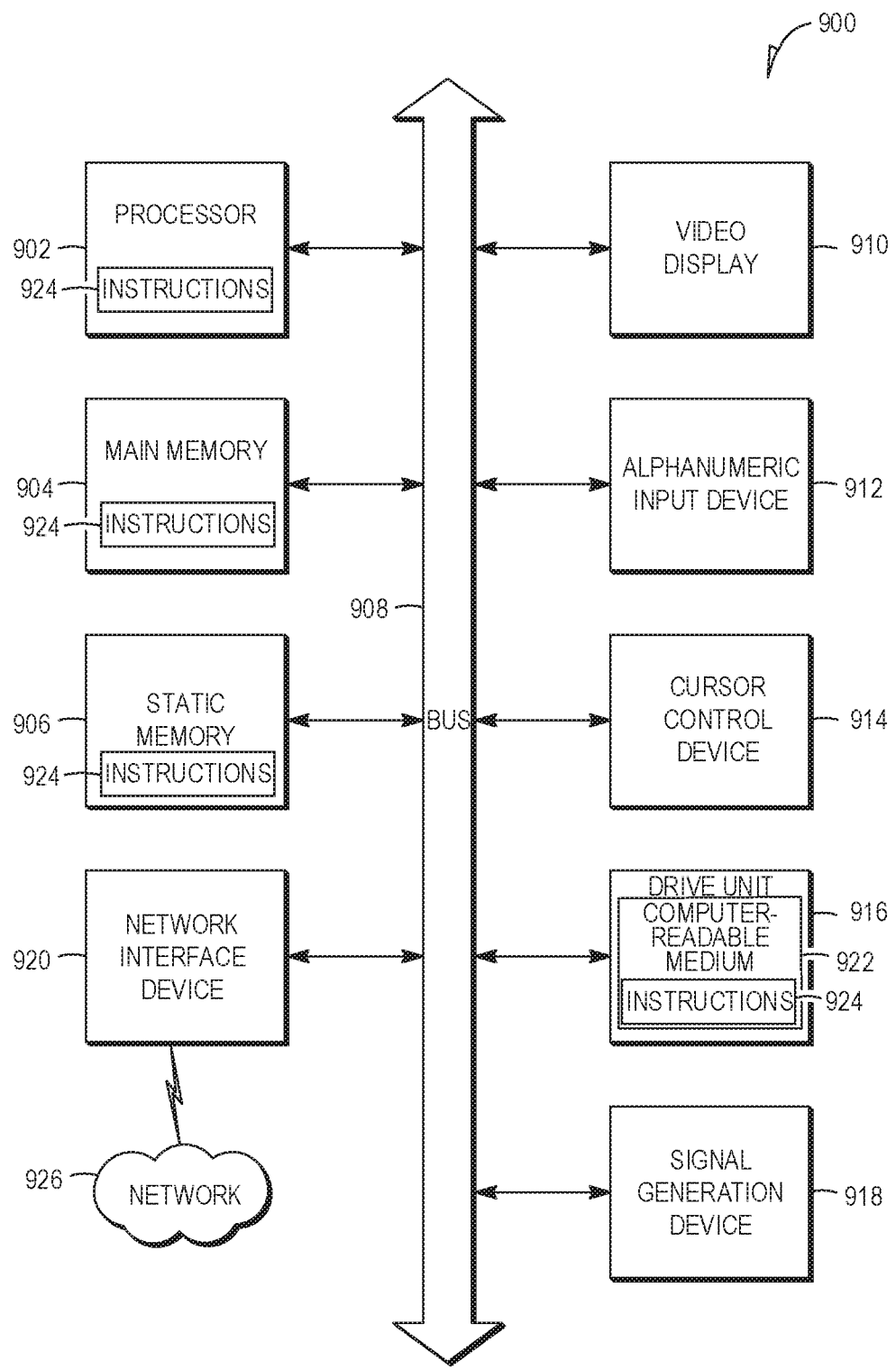
FIG. 9 shows a diagrammatic representation of a machine in the example form of a computer system within which a set of instructions may be executed to cause the machine to perform any one or more of the methodologies discussed herein.

FIG. 9 is a block diagram of a machine in the example form of a computer system 900 within which instructions 924 for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, a network switch, a network bridge, or any machine capable of executing the instructions 924 (sequential or otherwise) that specify actions to be taken by that machine. Further, while only a single machine is illustrated, the term "machine" shall also be taken to include any collection of machines that individually or jointly execute a set (or multiple sets) of instructions 924 to perform any one or more of the methodologies discussed herein.

The example computer system 900 includes a processor 902 (e.g., a central processing unit (CPU), a graphics processing unit (GPU), or both), a main memory 904, and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a user interface (UI) navigation (or cursor control) device 914 (e.g., a mouse), a disk drive unit 916, a signal generation device 918 (e.g., a speaker), and a network interface device 920.

The disk drive unit 916 includes a computer-readable medium 922 on which is stored one or more sets of data structures and instructions 924 (e.g., software) embodying or utilized by any one or more of the methodologies or functions described herein. The instructions 924 may also reside, completely or at least partially, within the main memory 904 and/or within the processor 902 during execution thereof by the computer system 900, the main memory 904 and the processor 902 also constituting computer-readable media 922. The instructions 924 may also reside, completely or at least partially, within the static memory 906.

While the computer-readable medium 922 is shown, in an example embodiment, to be a single medium, the term "machine-readable medium" may include a single medium or multiple media (e.g., a centralized or distributed database, and/or associated caches and servers) that store the one or more instructions 924 or data structures. The term "computer-readable medium" shall also be taken to include any tangible medium that is capable of storing, encoding, or carrying the instructions 924 for execution by the machine and that cause the machine to perform any one or more of the methodologies of the present embodiments, or that is capable of storing, encoding, or carrying data structures utilized by or associated with such instructions 924. The term "computer-readable medium" shall accordingly be taken to include, but not be limited to, solid-state memories, and optical and magnetic media. Specific examples of computer-readable media 922 include non-volatile memory, including by way of example semiconductor memory devices (e.g., erasable programmable read-only memory (EPROM), electrically erasable programmable read-only memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 924 may further be transmitted or received over a communication network 926 using a transmission medium. The instructions 924 may be transmitted using the network interface device 920 and any one of a number of well-known transfer protocols (e.g., hypertext transfer protocol (HTTP)). Examples of communication networks 926 include a local-area network (LAN), a wide-area network (WAN), the Internet, mobile telephone networks, plain old telephone service (POTS) networks, and wireless data networks (e.g., Wi-Fi and WiMAX networks). The term "transmission medium" shall be taken to include any intangible medium capable of storing, encoding, or carrying the instructions 924 for execution by the machine, and includes digital or analog communications signals or other intangible media to facilitate communication of such software.

Although an embodiment has been described with reference to specific example embodiments, it will be evident that various modifications and changes may be made to these embodiments without departing from the scope of the present disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A control device comprising:
    a distance sensor configured to be attached to a barrier and to measure an opening formed by the barrier;
    a transmitter configured to transmit a control signal to a barrier controller, the barrier controller configured to control a movement of the barrier based on the control signal;
    a processor configured to perform operations comprising:
        receiving a requested size of the opening;
        transmitting, to the barrier controller, a first control signal that instructs the barrier controller to move the barrier;
        transmitting, to the barrier controller, a second control signal that instructs the barrier controller to stop the movement of the barrier after an elapsed time has expired;
        measuring a final size of the opening after the elapsed time has expired; and
        adjusting the elapsed time based on the final size of the opening and the requested size of the opening.

2. The control device of claim 1, wherein the operations comprise:
    determining that the final size of the opening is greater than or equal to the requested size of the opening,
    wherein the second control signal is transmitted to the barrier controller in response to determining that the final size of the opening is at least equal to the requested size of the opening.

3. The control device of claim 2, wherein the elapsed time is calculated based on the determining that the final size of the opening is at least equal to the requested size of the opening, wherein the final size of the opening is measured after the barrier has stopped moving.

4. The control device of claim 1, wherein the operations further comprise:
    calculating a speed of the movement of the barrier;
    calculating a size difference between the requested size of the opening and the final size of the opening;
    calculating a time difference based on the size difference and the speed of the movement of the barrier; and
    recursively adjusting the elapsed time by subtracting the time difference from the elapsed time.

5. The control device of claim 4, wherein the operations further comprise:
    receiving a second requested size of the opening;
    computing a second elapsed time based on the second requested size of the opening, the speed of the movement of the barrier, and the time difference;
    transmitting, to the barrier controller, the first control signal; and
    transmitting, to the barrier controller, the second control signal after the second elapsed time has expired.

6. The control device of claim 1, wherein the distance sensor is configured to measure an offset distance between the distance sensor and an obstacle to the barrier in a closed position of the barrier, the obstacle to the barrier being adjacent to the barrier in the closed position of the barrier, wherein the operations comprise adjusting the requested size of the opening by the offset distance, and adjusting the final size of the opening by the offset distance.

7. The control device of claim 1, wherein the operations further comprise:
    receiving a wireless communication from a mobile device, the wireless communication identifying the requested size of the opening,
    wherein the first control signal is wirelessly communicated to the barrier controller,
    wherein the second control signal is wirelessly communicated to the barrier controller.

8. The control device of claim 1, wherein the operations further comprise:
    identifying a server registered with the barrier controller; and
    providing data identifying opening sizes and corresponding adjusted elapsed times to the server.

9. The control device of claim 1, wherein the barrier comprises one of a window, a door, and a garage door.

10. The control device of claim 1, wherein the distance sensor is configured to measure the opening formed between an end of the barrier and an obstacle, the end of the barrier being adjacent to the obstacle when the barrier is in a closed position of the barrier.

11. A method comprising:
receiving a requested size of an opening of a barrier;
transmitting, to a barrier controller, a first control signal that instructs the barrier controller to move the barrier;
transmitting, to the barrier controller, a second control signal that instructs the barrier controller to stop the movement of the barrier after an elapsed time has expired;
measuring a final size of the opening after the elapsed time has expired; and
adjusting the elapsed time based on the final size of the opening and the requested size of the opening.

12. The method of claim 11, further comprising:
determining that the final size of the opening is greater than or equal to the requested size of the opening,
wherein the second control signal is transmitted to the barrier controller in response to determining that the final size of the opening is at least equal to the requested size of the opening.

13. The method of claim 12, wherein the elapsed time is calculated based on the determining that the final size of the opening is at least equal to the requested size of the opening, wherein the final size of the opening is measured after the barrier has stopped moving.

14. The method of claim 11, further comprising:
calculating a speed of the movement of the barrier;
calculating a size difference between the requested size of the opening and the final size of the opening;
calculating a time difference based on the size difference and the speed of the movement of the barrier; and
recursively adjusting the elapsed time by subtracting the time difference from the elapsed time.

15. The method of claim 14, further comprising:
receiving a second requested size of the opening;
computing a second elapsed time based on the second requested size of the opening, the speed of the movement of the barrier, and the time difference;
transmitting, to the barrier controller, the first control signal; and
transmitting, to the barrier controller, the second control signal after the second elapsed time has expired.

16. The method of claim 11, wherein the distance sensor is configured to measure an offset distance between the distance sensor and an obstacle to the barrier in a closed position of the barrier, the obstacle to the barrier being adjacent to the barrier in the closed position of the barrier,
wherein the method further comprises adjusting the requested size of the opening by the offset distance, and adjusting the final size of the opening by the offset distance.

17. The method of claim 11, further comprising:
receiving a wireless communication from a mobile device, the wireless communication identifying the requested size of the opening,
wherein the first control signal is wirelessly communicated to the barrier controller,
wherein the second control signal is wirelessly communicated to the barrier controller.

18. The method of claim 11, further comprising:
identifying a server registered with the barrier controller; and
providing data identifying opening sizes and corresponding adjusted elapsed times to the server.

19. The method of claim 11, wherein the distance sensor is configured to measure the opening formed between an end of the barrier and an obstacle, the end of the barrier being adjacent to the obstacle when the barrier is in a closed position of the barrier.

20. A non-transitory computer-readable storage medium storing a set of instructions that, when executed by a processor, cause the processor to perform operations comprising:
receiving a requested size of an opening of a barrier;
transmitting, to a barrier controller, a first control signal that instructs the barrier controller to move the barrier;
transmitting, to the barrier controller, a second control signal that instructs the barrier controller to stop the movement of the barrier after an elapsed time has expired;
measuring a final size of the opening after the elapsed time has expired; and
adjusting the elapsed time based on the final size of the opening and the requested size of the opening.

* * * * *